(12) United States Patent
Chang et al.

(10) Patent No.: US 8,581,847 B2
(45) Date of Patent: Nov. 12, 2013

(54) HYBRID POINTING DEVICE

(75) Inventors: Yen Min Chang, Hsin-Chu (TW); Yi Hsien Ko, Hsin-Chu (TW)

(73) Assignee: Pixart Imaging Inc., Hsin-Chu (TW)

( * ) Notice: Subject to any disclaimer, the term of this patent is extended or adjusted under 35 U.S.C. 154(b) by 0 days.

(21) Appl. No.: 13/454,353

(22) Filed: Apr. 24, 2012

(65) Prior Publication Data
US 2012/0206353 A1   Aug. 16, 2012

Related U.S. Application Data

(63) Continuation-in-part of application No. 12/770,875, filed on Apr. 30, 2010.

(60) Provisional application No. 61/255,853, filed on Oct. 29, 2009.

(51) Int. Cl.
*G06F 3/033* (2013.01)

(52) U.S. Cl.
USPC ........... 345/163; 345/156; 345/166; 345/173; 178/18.01; 178/18.03

(58) Field of Classification Search
USPC ...................... 345/156–178; 178/18.09, 18.11
See application file for complete search history.

(56) References Cited

U.S. PATENT DOCUMENTS

| | | | |
|---|---|---|---|
| 4,589,140 A | 5/1986 | Bishop et al. | |
| 4,782,328 A | 11/1988 | Denlinger | |
| 5,484,966 A | 1/1996 | Segen | |
| 7,552,402 B2 | 6/2009 | Bilow | |
| 7,969,410 B2 | 6/2011 | Kakarala | |
| 8,004,660 B2 | 8/2011 | Brown | |
| 8,232,966 B2 * | 7/2012 | Cheah et al. | 345/166 |
| 2004/0046741 A1 * | 3/2004 | Low et al. | 345/166 |
| 2004/0239653 A1 | 12/2004 | Stuerzlinger | |
| 2007/0152966 A1 | 7/2007 | Krah et al. | |
| 2008/0150913 A1 | 6/2008 | Bell et al. | |
| 2008/0259053 A1 | 10/2008 | Newton | |
| 2009/0058807 A1 | 3/2009 | Kang et al. | |
| 2009/0090569 A1 | 4/2009 | Lin | |
| 2009/0109178 A1 | 4/2009 | Kim et al. | |
| 2010/0026723 A1 | 2/2010 | Nishihara et al. | |
| 2010/0079413 A1 | 4/2010 | Kawashima et al. | |
| 2010/0265178 A1 | 10/2010 | Benko et al. | |
| 2011/0029185 A1 | 2/2011 | Aoki et al. | |

* cited by examiner

*Primary Examiner* — Dmitriy Bolotin
(74) *Attorney, Agent, or Firm* — Lowe, Hauptman & Ham

(57) ABSTRACT

The present invention discloses a hybrid pointing device including an optical navigation module and a pointing module. The optical navigation module is configured to replace the conventional buttons of a convention pointing device, such as an optical mouse or a trackball mouse. The optical navigation module is configured to sense gestures of at least one object operated by a user to activate commands associated with particular programs running on the host. Since the optical navigation module is only configured to sense gestures of the object but not the movement of the hybrid pointing device relative to a surface, the resolution thereof is aimed to be sufficiently high enough for sensing gestures and no need to be relatively high.

10 Claims, 7 Drawing Sheets

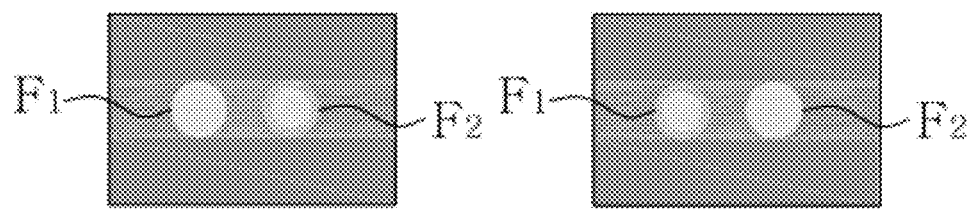
FIG. 9g  FIG. 9h
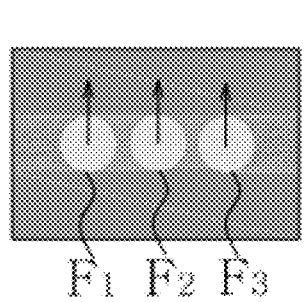 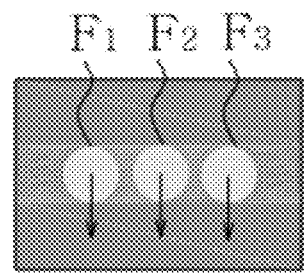
FIG. 10a  FIG. 10b

HYBRID POINTING DEVICE

CROSS REFERENCE TO RELATED APPLICATION

This application is a continuation-in-part application of U.S. Ser. No. 12/770,875, filed on Apr. 30, 2010, the full disclosure of which is incorporated herein by reference.

BACKGROUND

1. Field of the Invention

This invention generally relates to a hybrid pointing device and, more particularly, to a hybrid pointing device including an optical navigation module configured to sense a gesture of at least one finger and a pointing module configured to sense a movement of the hybrid pointing device relative to a surface.

2. Description of the Related Art

For a conventional pointing device, e.g. an optical mouse and a trackball mouse, a pointer shown on a display of a host is controlled by a relative displacement between the pointing device and a surface. The pointing device generally includes two buttons (left and right buttons) for activating commands associated with the movement of the pointer on the display. Usually, when a user wants to execute a program, drag an icon, modify a picture, etc., the user moves the pointer on the display and points the pointer on a particular graphic user interface (GUI) then presses at least one button to activate commands. To enhance the applications of conventional pointing devices, some pointing devices are provided with more than two buttons; therefore, the user may define particular functions activated by pressing the additional buttons or by pressing several buttons simultaneously associated with moving the pointer on the display.

However, too many buttons integrated on a pointing device may confuse the user since the user can only operate the buttons with at most five fingers one time. For example, when the user tries to press as many buttons as he or she can, the user may hardly move the pointing device to move the pointer on the display.

There is another kind of pointing device which applies an optical sensor module in replace of the conventional mouse. The optical sensor module is configured to emit light to the finger and receive the reflected light from the finger for sensing a movement of the finger thereby controlling the pointer on the display. This kind of pointing device is compact and the sensing area is relatively small, which is disadvantaged in low resolution, hard to precisely control the pointer, hard to move the pointer fast, etc.

Besides, the aforementioned conventional mouse is difficult in controlling the pointer to move very straight toward a direction, to move along a particular path, to draw a fair arc or to have an accurate fine movement due to the unstable operation of human hands and fingers.

Recently, a kind of pointing device having a capacitive touch module (CTM) or a resistive touch module (RTM) is provided. The CTM or RTM is applied to sense the touching motion of fingers for activating commands. More particularly, the CTM or RTM includes a sensor array uniformly distributed over a sensing area. When the fingers properly touch on the sensing area, the touching motion will cause an electrical variation of the sensor array that indicates the touched position on the sensor array. However, to ensure correct detection of fingers, the whole CTM or RTM has to maintain in function-well condition. Once a portion of the CTM or RTM is failed, the movement of fingers cannot be detected correctly. Furthermore, fingers have to substantially touch the CTM or RTM strong enough to be sensed by the pointing device. All of these properties limit the application of the technologies.

Thus, it is important to provide a pointing device that may activate commands in various ways without using buttons and move precisely for better control.

SUMMARY

The present invention provides a hybrid pointing device including an optical navigation module and a pointing module. The pointing module is configured to sense a movement of the hybrid pointing device relative to a surface for moving a pointer on a display. The optical navigation module is configured to replace the conventional buttons of a conventional pointing device, such as an optical mouse or a trackball mouse. The optical navigation module is configured to sense gestures of at least one finger of a user to activate commands associated with particular programs running on a host. Since the optical navigation module is only configured to sense gestures of the finger but not the movement of the hybrid pointing device relative to the surface, the resolution of the optical navigation module is aimed to be sufficiently high enough for sensing gestures and no need to relatively high.

The present invention further provides a hybrid pointing device including an optical navigation module and a pointing module. The optical navigation module is configured to assist in moving the pointer more close to the user's demands. By sensing a particular gesture of at least one finger, the optical navigation module may be configured to activate a command for limiting the moving direction of the pointer so as to move the pointer in a straight line on the display. Therefore, the user may operate the pointer very precisely along a desired direction better than a conventional pointing device. Besides, by sensing a particular gesture of at least one finger, the optical navigation module may be configured to directly move the pointer, to move the pointer at a relatively higher speed on the display, or to directly move the pointer in a limited range with the assistance of at least one key on a keyboard.

Since the optical navigation module may be operated in many ways, such as sliding at least one finger, posing a gesture, multi-touching of fingers, clicking of at least one finger, rotating at least one finger, etc., the optical navigation module provides a more instinctive way of operating the pointer on the display rather than conventional pointing devices in which a user may only choose press or not to press buttons thereon to activate commands.

The optical navigation module of the present invention includes at least one image sensor and at least one light source. The light source emits light and the emitted light is received by the image sensor. At least one finger of a user motions to block the emitted light and to cause at least one interruption when the image sensor receives the emitted light. The optical navigation module then transfers the interruption into electric signal for controlling the pointer shown on the display or for activating particular programs running on a host.

The hybrid pointing device of the present disclosure is for being operated by a user on a surface. The hybrid pointing device includes a storage unit, a first module, a second module and a processor. The storage unit is configured to previously store information of predetermined gestures. The first module is configured to sense a movement of the hybrid pointing device relative to the surface. The second module includes at least one light source and at least one image sensor. The light source is configured to emit light. The image sensor is configured to capture an image containing at least one interruption of at least one finger of the user operated upon an operation field which is located only at a top front portion of the hybrid pointing device, wherein the finger blocks the light emitted by the light source. The processor is configured to compare a position variation of the interruption with the information of predetermined gestures to identify a current gesture.

The optical navigation module of the present invention includes at least one image sensor and at least one light source. The light source emits light and at least one object operated by a user reflects the emitted light to be received by the image sensor. Since different motions of gestures of the object cause different images on the image sensor, the optical navigation module then transforms the images into electric signals for controlling the pointer shown on a display or for activating particular programs running on a host.

The hybrid pointing device of the present invention is for being operated by a user on a surface. The hybrid pointing device includes a storage unit, a first module, a second module and a processor. The storage unit is configured to previously store information of predetermined gestures. The first module is configured to sense a movement of the hybrid pointing device relative to the surface. The second module includes a light source and an image sensor. The light source is configured to emit light. The image sensor is configured to capture an image containing at least one finger image of at least one finger of the user operated upon an operation field which is located only at a top front portion of the hybrid pointing device. The processor is configured to compare a position variation of the finger image with the information of predetermined gestures to identify a current gesture.

In an aspect, the image sensor captures the image containing one finger image of one finger, two finger images of two fingers or three finger images of three fingers of the user operated upon the operation field.

In an aspect, the information of predetermined gestures includes predetermined direction moving gestures, rotating gestures, relative motion gestures and click gestures, wherein the predetermined direction moving gestures may include, for example, a left moving gesture, a right moving gesture, an upward moving gesture and a downward moving gesture; the rotating gestures may include, for example, a clockwise moving gesture and a counterclockwise moving gesture; the relative moving gestures may include, for example, a moving closer gesture and a moving apart gesture; the click gestures may include, for example, left-button click gesture and right-button click gesture.

In an aspect of the present invention mentioned above, the position information of the light spot on the image is retrieved from a look-up table formed by dividing a field of view of the image sensor into a matrix of many sub-areas and pre-stored in the processor.

The optical navigation module of the present invention includes at least one image sensor and a touch plate disposed opposite to the image sensor. At least one object operated by a user are placed above the touch plate causing shadows with different shapes, and the image sensor then senses the image with shadows. The optical module transforms the images into electric signals for controlling the pointer shown on a display or for activating particular programs running on a host. The touch plate may be transparent to visible light and may be formed with a plurality of through holes thereon for light transmission.

The present invention is able to be integrated with the conventional structure of optical mouse or trackball mouse by adding the optical navigation module of the present invention and changing related periphery devices. In an aspect of the present invention, the first module and the second module included in the hybrid pointing device may share the same light source.

BRIEF DESCRIPTION OF THE DRAWINGS

Other objects, advantages, and novel features of the present invention will become more apparent from the following detailed description when taken in conjunction with the accompanying drawings.

FIGS. 9a-9h show schematic diagrams of the information of predefined gestures of two fingers.

FIGS. 10a-10b show schematic diagrams of the information of predefined gestures of three fingers.

DETAILED DESCRIPTION OF THE EMBODIMENT

In the descriptions that follow, the present invention will be described in reference to the embodiments that describe a hybrid pointing device with optical navigation module for replacing the conventional pointing device with buttons. However, embodiments of the present invention are not limited to any particular environment, application or implement. Therefore, the descriptions of the embodiments that follow are for purpose of illustration but not limitation. It is understood that elements indirectly related to the present invention are omitted and are not shown in the following embodiments and drawings.

The following figures show several examples of the present invention, which are similar to conventional mouse. That is, the hybrid pointing devices of the present invention shown below are intended to be placed on a smooth working surface, and the hybrid pointing devices include a pointing module that emits light to the working surface and receives the reflected light from the working surface for controlling the movement of a pointer shown on a display of a host. In other embodiments, the pointing module may be replaced by other equipment, such as a trackball pointing module. People skilled in the art know well the functions of conventional pointing modules, and redundant explanation is omitted hereinafter. In addition, the hybrid pointing devices further include an optical navigation module for recognizing predefined or predetermined gestures of at least one finger of a user so as to activate corresponding commands; for example, gestures of one finger, two fingers or three fingers of the user.

Figure 1:
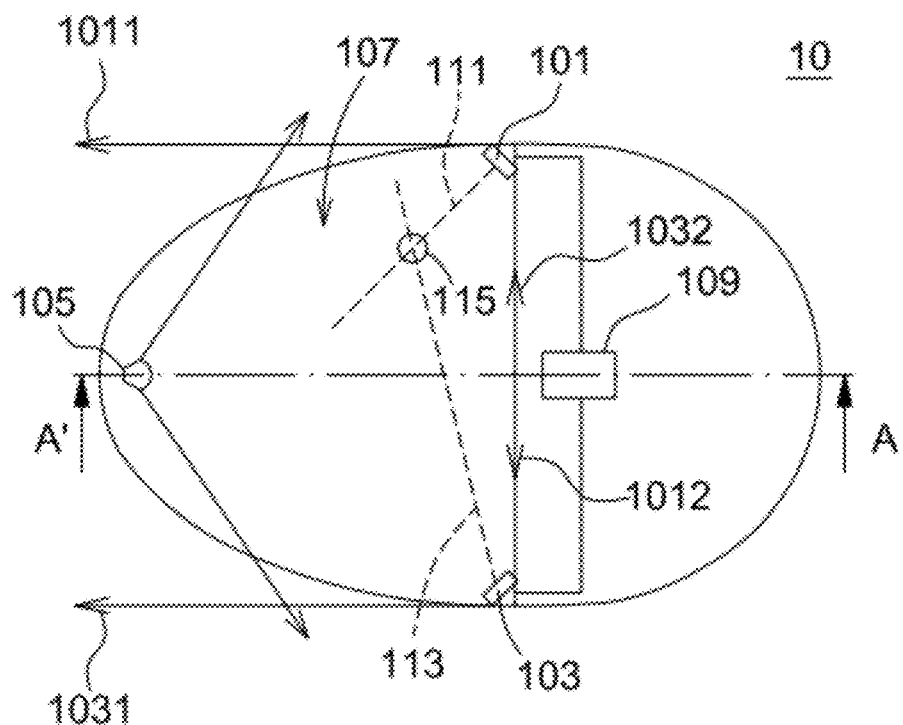
FIG. 1 shows a top view of the hybrid pointing device according to the first embodiment of the present invention.
Figure 2:
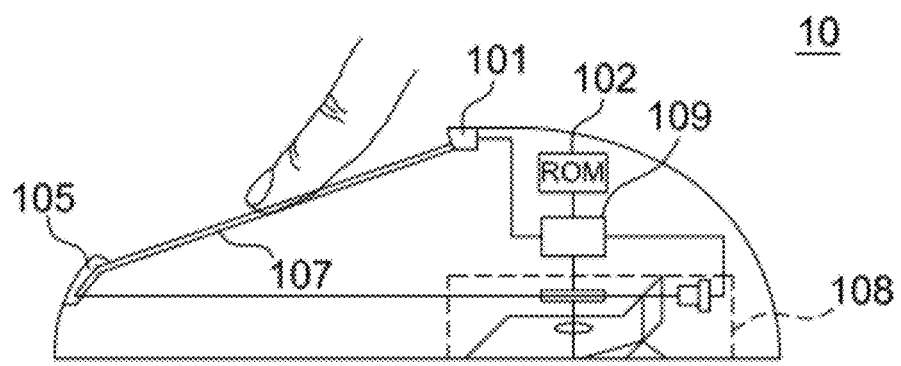
FIG. 2 shows a cross-sectional view taken along line A-A' of FIG. 1.

FIG. 1 shows a top view of the hybrid pointing device according to the first embodiment of the present invention. The hybrid pointing device 10 includes an optical navigation module having two image sensors 101, 103, a storage unit 102 (shown as ROM, but not limited to), a light source 105 and a processor 109, which is electrically connected to the image sensors 101, 103 and the light source 105. It is noted that the number of the light source and the image sensor is not the limitation of the present invention. In this embodiment, the processor 109 may also electrically connect to the pointing module 108 (shown in FIG. 2) for processing the data therefrom. However, in other embodiment, the pointing module 108 may include another processor operating separately. The image sensor is configured to optically cover the operation field 107 of the hybrid pointing device 10. In this embodiment, the image sensors 101, 103 are configured to optically cover the operation field 107 as shown in FIG. 2, which is a cross-sectional view taken along line A-A' of the hybrid pointing device 10 shown in FIG. 1. It is noted that the processor 109 shown in FIG. 2 is only a sketch block for illustration. The image sensors 101, 103 are disposed corresponding to the light source 105; therefore, the image sensors 101, 103 may receive the light emitted from the light source 105. The operation field 107 in the first embodiment is a tiled surface on which a user can conventionally put his or her fingers and move the fingers thereon. In other embodiment, the operation field 107 may be set horizontally or with concave shapes, as long as the operation field 107 would not blank the image sensors 101, 103 from receiving the emitted light from the light source 105. In other embodiment, the image sensors 101, 103 and the light source 105 may be placed in different positions, as long as a field of view of the image sensor 101, 103 is able to cover the light source 105. The light source 105 may be illuminated by the light source of the pointing module 108 via particular light guiding mechanism as shown in FIG. 2, i.e. the optical navigation module and the pointing module 108 share the same light source. The light source 105 may be an independent light source from the pointing module 108 in other embodiment.

More particular, relative positions between the light source 105 and the image sensors 101, 103 are limited by the field of view of the image sensor and the emitting field of the light source. The emitting field of the light source means the field that can be illuminated by the emitted light of the light source. Generally, an image sensor is characterized with a field of view, which defines the maximum field that it can sense. For example, the image sensor 101 roughly has a 90 degree field of view shown by two arrows 1011, 1012. The two arrows 1011, 1012 denote two boundary sides that the image sensor 101 cannot sense an object located outside the field of view. Similarly, the image sensor 103 may also have a 90 degree field of view shown by another two arrows 1031, 1032. In the first embodiment, the image sensors 101, 103 both have fields of view that cover the emitting field of the light source 105. In another embodiment, the light sources 101, 103 may be replaced with a linear light source, such as a light bar that can emit substantially parallel lights.

Figure 3A:
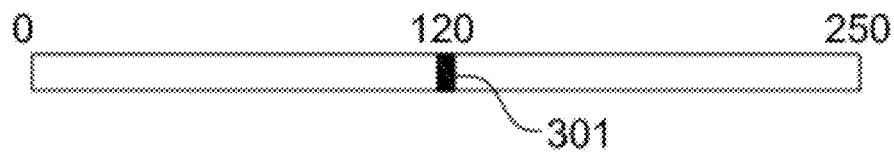
FIG. 3a-3b shows a schematic diagram of the interruption sensed by the image sensor shown in FIG. 1.
Figure 3B:
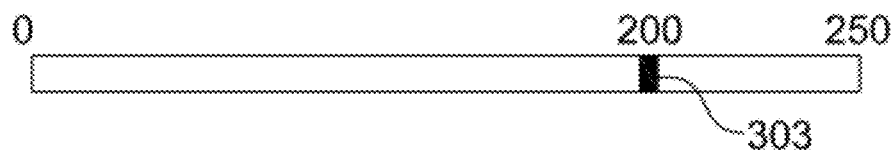

When a user puts at least one finger on the operation field 107, the finger blocks the light emitted from the light source 105 and causes at least one interruption on the image sensors 101, 103. Please refer to FIGS. 3a and 3b, they show schematic diagrams of an interruption sensed by the image sensors 101, 103, respectively. The image sensors 101 and 103 are linear image sensors in this embodiment, and the finger caused an interruption respectively in images 301 and 303, which are images captured by the image sensor 101, 103, respectively. Each of the images 301 and 303 shows a numerical value, which denotes the projection position within the field of view of each image sensor from one boundary to the other. In the embodiment, for example, each image sensor has a numerical value from 0 to 255. When a user puts at least one finger on the operation field 107, the finger blocks the emitted light and respectively causes an interruption 301 and 303 on the image sensors 101 and 103. The interruption 301 takes, for example, the numerical value of 120 and the interruption 303 takes, for example, the numerical value of 200, as shown in FIGS. 3a and 3b. It is appreciated that the user may also use other object, e.g. a touch pen, a touch stick or the like to operate inside the operation field 107 rather than use his or her finger in all embodiments of the present invention.

Virtually, it is able to draw a line 111 through the image sensor 101 and the position 115 of the touched finger, and a line 113 through the image sensor 103 and the position 115 of the touched finger. The positions of the image sensors 101, 103 may be mapped into two sets of coordinate values based on any conventional coordinate systems, such as a polar coordinate system or a Cartesian coordinate system. Then the processor 109 maps two numerical values, e.g. 120 and 200, into a set of coordinate value, i.e. a touch coordinate value, based on the same coordinate system and gets two equations from the lines 111 and 113. By solving the two equations, the processor 109 may realize the position 115 of the touched finger on the operation field 107. When the touched finger moves, the processor 109 can track the finger by continuously realizing the varied position of the touched finger. Once the touched finger moves to leaving the operation field 107, the processor 109 may also be aware of a fast variation caused by disappearance of the touched coordinate value.

Once the optical navigation module can track the movement of at least one finger, the tracking data may be used to activate particular commands. For example, if the touched finger moves toward right side, the optical navigation module can retrieve the tracking data and activate a command of scrolling the on-viewing page. If two touched fingers move apart or closer, the tracking data may be configured to activate a command of enlarging or shrinking the on-viewing screen or picture. If at least one touched finger moves clockwise or counterclockwise, the tracking data may be configured to rotate the on-viewing screen or picture. Furthermore, the user can set desired commands corresponding to particular motions of fingers.

Figure 4:
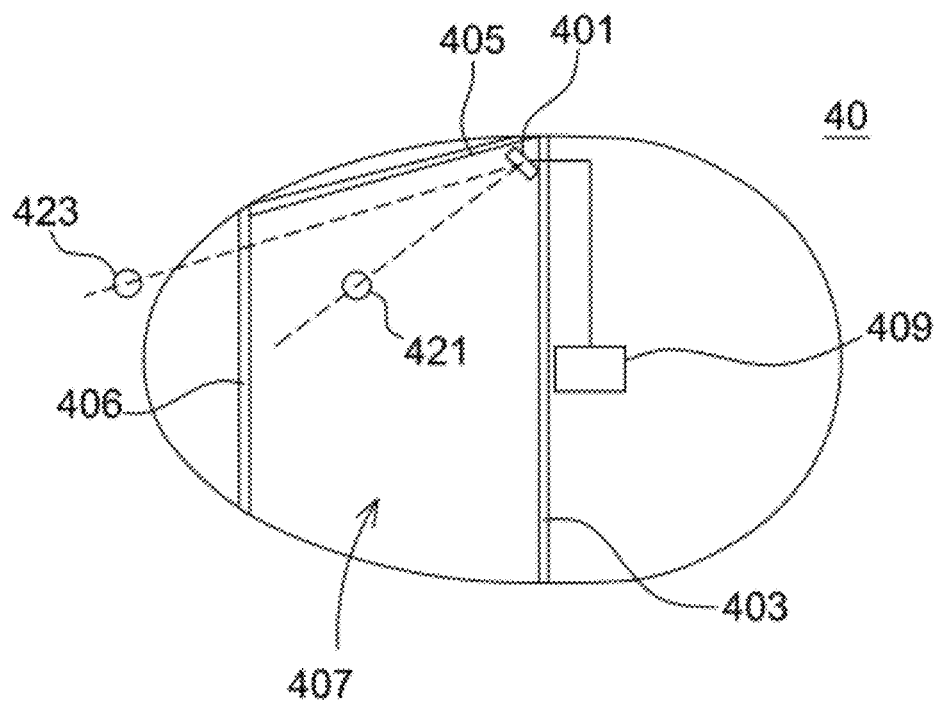
FIG. 4 shows a top view of the hybrid pointing device according to the second embodiment of the present invention.

FIG. 4 shows a top view of the hybrid pointing device 40 according to the second embodiment of the present invention. The main different between the first and second embodiments is that the second embodiment uses only one image sensor 401 with a reflector 406 and two linear light sources 403 and 405. In other embodiment, the linear light sources 403 and 405 may be formed as one linear light source and the reflector 406 may extend to a proper length, along a different direction, inside the field of view of the image sensor 401, e.g. to an edge opposite to the light source 405 in FIG. 4, or may be consisted several pieces of mirrors. In an alternative embodiment, one of the linear light sources 403 and 405 may be an active light source to emit light and the other may be a passive light source, e.g. a reflecting cloth, to reflect light emitted by the active light source. It can be understood that when a finger touches the operation field 407 on a position 421, it will cause a mirror image at a position 423 symmetrical to the position 421 by the reflector 406. A touched finger will cause two interruptions on the image sensor 401 (one is formed from blocking the light reflected by the reflector 406 and the other is the mirror image in the reflector 406 mapped from the finger on the position 421) and generates two numerical values, then the processor 409 maps two numerical values into coordinate values. As mentioned above, the position of the image sensor 401 may also be mapped into coordinate value. By solving the equations made of these coordinate values, the processor 409 can realize the position of the touched finger.

Figure 5:
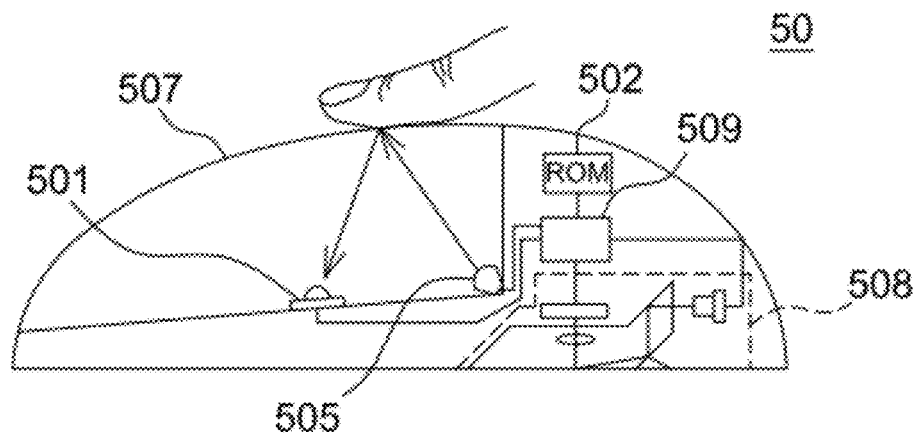
FIG. 5 shows a schematic diagram of the hybrid pointing device according to the third embodiment of the present invention.

FIG. 5 shows a schematic diagram of the hybrid pointing device 50 according to the third embodiment of the present invention. The hybrid pointing device 50 includes an image sensor 501, a storage unit 502 (shown as ROM, but not limited to), a light source 505 and a processor 509 electrically connected to the image sensor 501, the storage unit 502, the light source 505 and a pointing module 508. It is noted that the number of the light source and the image sensor is not the limitation of the present invention. The hybrid pointing device 50 further includes an operation field 507, which is an upper surface of a touch plate, for a user to place at least one finger and move the finger thereon. The light source 505 emits light and the finger of the user reflects the emitted light as shown in FIG. 5. Then the reflected light is received by the image sensor 501. The processor 509 is then able to identify the position of the finger on the operation field 507 and continuously track the movement of the finger thereon. The tracking data are used to activate particular commands as aforementioned in the first and second embodiments.

Moreover, since different motions of gestures of at least one finger cause different images on the image sensor 501, the user may activate commands by different gestures of at least one finger by technologies of image identification. When there is no finger close to the operation field 507, the light emitted from the light source 505 will go outward and the image sensor 501 cannot sense any reflected light from the operation field 507, i.e. the touch plate is transparent to the light emitted by the light source 505. When the user puts at least one finger on or closing to the operation field 507, the light emitted from the light source 505 will be reflected from the surface between the touched finger and the operation field 507 and causes at least one gradual light spot on the image sensed by the image sensor 505. The processor 509 then transforms the images into electric signals for controlling the pointer shown on a display or for activating particular programs running on a host. It is appreciated that a number of said light spots is determined according to the number of fingers upon (including in contact with or closing to) the operation field 507. In this embodiment, images captured by the image sensor 501 may be two-dimensional images.

Figure 6A:
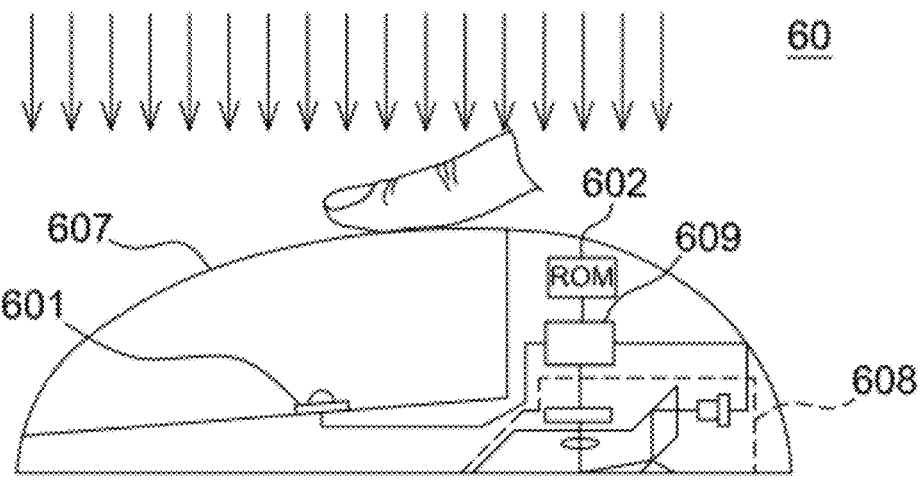
FIG. 6a shows a schematic diagram of the hybrid pointing device according to the fourth embodiment of the present invention.

FIG. 6a shows a schematic diagram of the hybrid pointing device 60 according to the fourth embodiment of the present invention. The hybrid pointing device 60 includes an image sensor 601, a storage unit 602 (shown as ROM, but not limited to) and a processor 609 electrically connected to the image sensor 601, the storage unit 602 and a pointing module 608. The image sensor 601 directly senses the operation field 607 when the ambient light is sufficiently bright, and the image sensor 601 is able to identify at least one finger placed on the operation field 607 from the environment. It is noted that the number of the image sensor is not the limitation of the present invention.

Figure 6B:
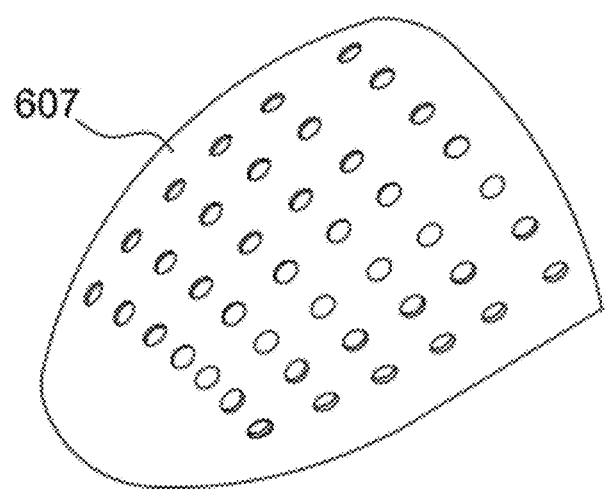
FIG. 6b shows a schematic diagram of the touch plate of the hybrid pointing device according to the fourth embodiment of the present invention, wherein the touch plate is formed with a plurality of through holes thereon.

The finger placed on the operation field 607 would cause shadows with different shapes. Then the shadows are sensed by the image sensor 601. The processor 609 is then able to identify the position of the finger on the operation field 607 and continuously track the movement of the finger thereon. The tracking data are used to activate particular commands as aforementioned in the first and second embodiments. Moreover, since different motions of gestures of at least one finger cause different images on the images sensor 601, the user may activate commands by different gestures of at least one finger. The processor 609 may be configured to identify the images caused by different gestures by technologies of image identification as aforementioned in the third embodiment. Since the image sensor 601 is configured to sense the shadows of the touched finger from blocking ambient light, the touch plate may be formed with a plurality of through holes thereon, as shown in FIG. 6b, such that the processor 609 is able to identify the position of the finger on the operation field 607 according to the through holes blocked by the touched finger and continuously track the movement of the finger on the operation field 607. It is appreciated that the shape and the density of the through holes shown in FIG. 6b are not limitations of the present invention. It is appreciated that a number of said shadows is determined according to the number of fingers upon the operation field 607. In this embodiment, images captured by the image sensor 601 may be two-dimensional images.

In other embodiment, the operation field 507 and 607 may have a light guider being configured to guide light through the whole operation field. For example, in FIG. 5, the light source 505 may be rearranged to be placed at one end of the operation field 507, which has a light guider, and then the emitted light goes along the light guider operation field 507. The image sensor 501 then senses an image of the operation field 507 with normally distributed light intensity. When the user puts at least one finger on the operation field 507, the touched finger will change the light intensity, and the sensed image will show at least one interruption caused by the touched finger. The processor 509 may be configured to identify the sensed image by technologies of image identification as aforementioned in the third embodiment. In FIG. 6a, the operation field 607 may have a light guider for guiding the ambient light or light of an auxiliary light source through the whole operation field 607, then the image sensor 601 is configured to operation as well as the image sensor 501 just mentioned above.

Since the optical navigation module of the present invention is configured to sense the gesture or movement of a user's finger, the resolution of the image sensor of all aforementioned embodiments may be not as high as the sensor of the pointing module. More particularly, the resolution of the image sensor is aimed to be sufficiently high enough for sensing gesture or movement of at least one finger but not the details of the finger's surface, such as the finger print. In other words, as long as the image sensor is able to sense a rough outline of the finger, the resolution of the image sensor is enough. Embodiments of the image sensor include a charge coupled device (CCD) image sensor, a complementary metal oxide semiconductor (CMOS) image sensor, or the like.

In addition, the hybrid pointing devices mentioned above may further include a transmission interface unit for transmitting the movement sensed by the pointing module to a display for moving a pointer on the display and for transmitting commands corresponding to gestures of the finger identified by the processor for activating particular programs running on a host or for directly moving the pointer on the display.

The operation field of all aforementioned embodiments can be divided into a collection of many sub-areas in light of the coordinate system the optical navigation module applies. Taking Cartesian coordinate system as an example, please refer to FIG. 7, it shows a schematic diagram of the operation field divided as a matrix of many sub-areas. It is assumed that the touched finger occupies the position 71 on the operation field and then moves to the position 72. The optical navigation module only needs to continuously sense which sub-area is touched by the finger for calculating the movement of the touched finger, then activated particular commands in response to the movement. Even more, the optical navigation module can only sense the start point and the end point when the touched finger moves to retrieve the moving direction of the touched finger, then activated particular commands in response to the moving information of the touched finger.

Figure 7:
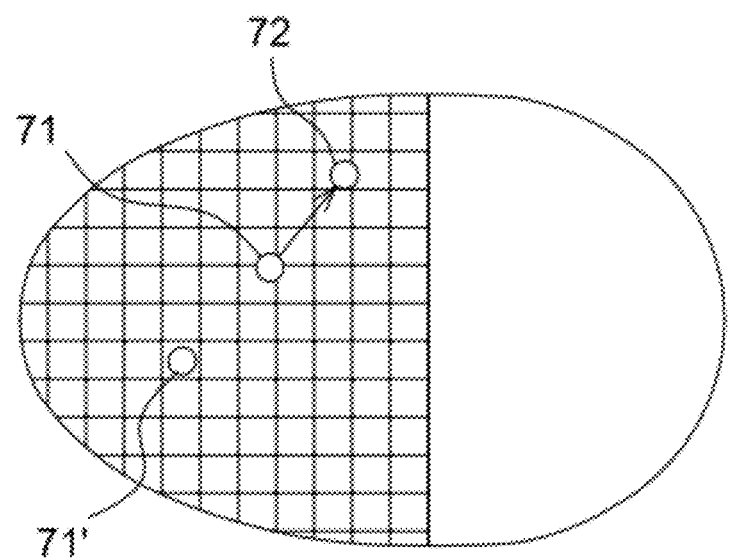
FIG. 7 shows a schematic diagram of the operation field divided as a matrix of many sub-areas.

When the finger touches more than one sub-area at once, like the positions 71 and 71' shown in FIG. 7, the optical navigation module can estimate the position information by many ways such as, but not limited to, averaging corresponding coordinate values of the two sub-areas, taking the two sub-areas together as a start point, choosing the one sub-area which is occupied by the touched finger most, randomly choosing one of the touched sub-areas, etc. Meanwhile, the optical navigation module may pre-store the position information of the sub-areas in advance, such as storing the position information in a look-up table stored in a memory device, and then retrieves the pre-stored position information when the finger touched the operation field so as to enhance the processing speed. Since the main objective of the optical navigation module is to determine the gesture or movement of the fingers, as long as the optical navigation module applies the same way to estimate the position information, the output of the optical navigation module can be applied to determine the gesture or movement of the fingers.

The aforementioned light source may be any conventional light source, such as LED, LD, IR, etc., and is not a limitation of the present invention. The advantage of applying IR as the light source is to use the invisible character thereof to prevent from affecting the user's sense of sight. The tracking data retrieved from the movement of the touched fingers are also available in assisting moving the pointer shown on the display. For example, when the optical navigation module senses the touched finger moving in a direction identical to the direction that the pointing module moves, e.g. the touched finger moves toward left as well as the pointing module moves the pointer toward left, the pointer may be accelerated in moving faster toward left. Or the optical navigation module can temporarily control the movement of the pointer, with or without the assistance of at least one key on a keyboard, by moving at least one finger on the operation field after the optical navigation module senses a particular gesture. The operation field and/or the image sensor of the aforementioned embodiments may be placed with a tilted angle for placing the fingers conveniently and easier sensing the image.

In one embodiment, the operation field of the optical navigation module is preferably located only at a top front portion of the hybrid pointing device such that when a user utilizes his or her hand to operate the hybrid pointing device, only his or her finger(s) is detected by the optical navigation module and preferably the palm of the hand will not be detected; that is, said top front portion of the hybrid pointing device is referred to the portion corresponding to only the finger(s) of the user.

The commands that may be activated by gestures of at least one finger of a user will then be illustrated hereinafter. It should be mentioned that the following gestures may be previously defined or predetermined before shipment of the hybrid pointing device. However, the user may further define particular gestures to control desired commands on a host according to his or her habits. In addition, each finger images "F", "$F_1$", "$F_2$" and "$F_3$" shown in FIGS. 8a to 10b may be a light spot, a shadow or an interruption as mentioned in the first to fourth embodiments.

One Finger Tracking

Figure 8A:
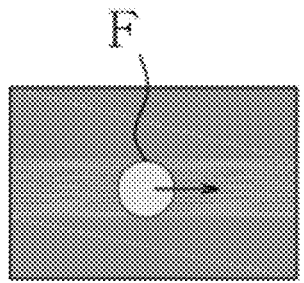
FIGS. 8a-8f show schematic diagrams of the information of predefined gestures of one finger.
Figure 8B:
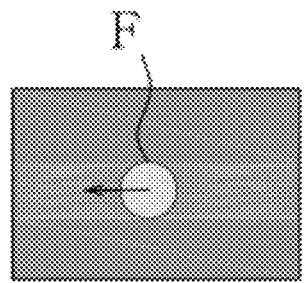
Figure 8C:
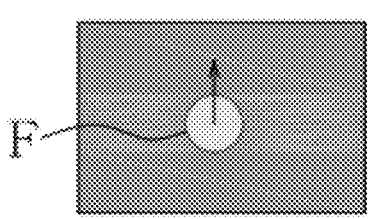
Figure 8D:
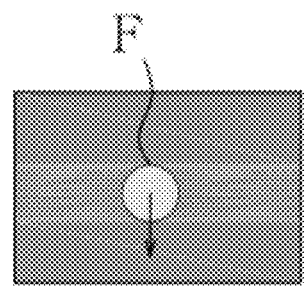
Figure 8E:
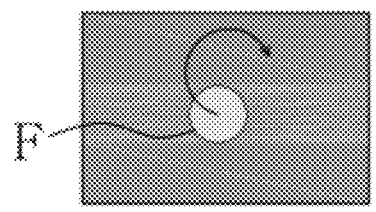
Figure 8F:
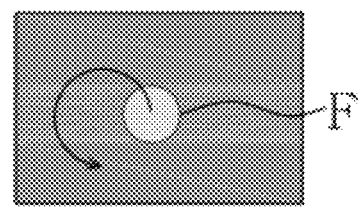

Referring to FIGS. 8a to 8f, they show gestures of one finger of a user. For example, FIGS. 8a to 8d show that the user moves the finger image "F" toward a predetermined direction, including toward right, toward left, upward and downward respectively. When the processor identifies these predetermined direction moving gestures, the processor controls a host coupled to the hybrid pointing device of the present disclosure to perform corresponding commands, such as, but not limited to, scrolling an on-viewing screen or flipping an on-viewing pages according to the moving direction of the finger. FIGS. 8e and 8f show that the user moves the finger image "F" clockwise or counterclockwise respectively. When the processor identifies these rotating gestures, the processor controls a host coupled to the hybrid pointing device of the present disclosure to perform corresponding commands, such as, but not limited to, rotating an on-viewing screen or an item. It is appreciated that the gestures of one finger are not limited to those shown in FIGS. 8a to 8f.

Two Fingers Tracking

Figure 9A:
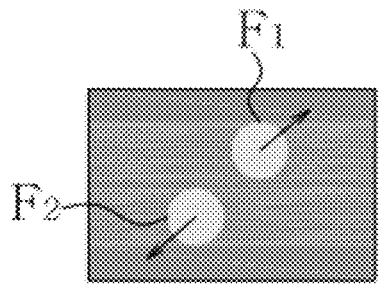
Figure 9B:
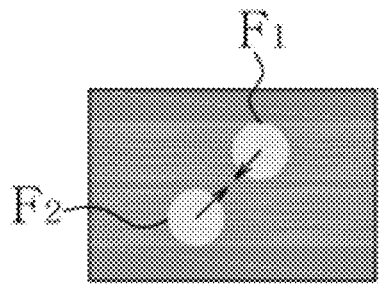
Figure 9C:
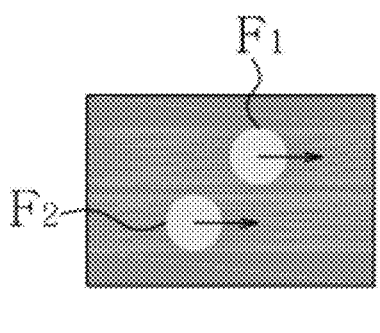
Figure 9D:
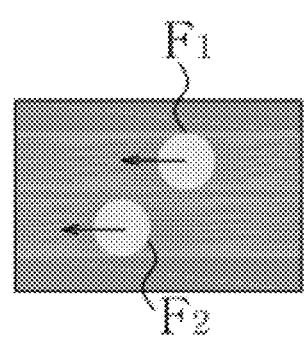
Figure 9E:
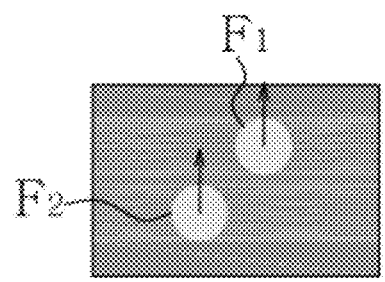
Figure 9F:
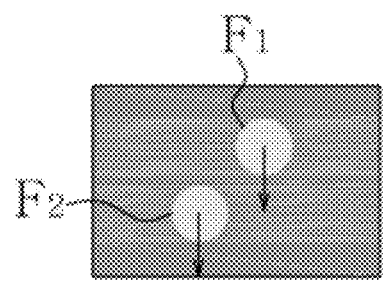

FIGS. 9a to 9h show gestures of two fingers of a user. For example, FIGS. 9a and 9b show that the user moves two finger images "$F_1$" and "$F_2$" apart and closer respectively. When the processor identifies these relative motion gestures, the processor controls a host coupled to the hybrid pointing device of the present disclosure to perform corresponding commands, such as, but not limited to, enlarging or shrinking a selected item or zooming in or zooming out an on-viewing screen. FIGS. 9c to 9f show that the user moves two finger images "$F_1$" and "$F_2$" in the same direction toward a predetermined direction including toward right, toward left, upward and downward respectively. When the processor identifies these predetermined direction moving gestures, the processor controls a host coupled to the hybrid pointing device of the present disclosure to perform corresponding commands, such as, but not limited to, scrolling an on-viewing screen or flipping an on-viewing pages at a faster speed than that only controlled by one finger. FIGS. 9g and 9h show that the user puts one finger steady on the operation field and clicks another finger thereon such that the image sensor captures images including one of the finger images appearing and disappearing alternatively within a predetermined time interval, e.g. the left finger image "$F_1$" always exists but the right finger image "$F_2$" appears and disappears in FIG. 9g and the right finger image "$F_2$" always exists but the left finger image "$F_1$" appears and disappears in FIG. 9h. When the processor identifies these click gestures, the processor controls a host coupled to the hybrid pointing device of the present disclosure to perform corresponding commands, such as, but not limited to, a right-button click or a left-button click.

Three Fingers Tracking

FIGS. 10a to 10b show gestures of three fingers of a user. For example, FIGS. 10a to 10b show that the user moves three finger images "$F_1$" to "$F_3$" in the same direction toward a predetermined direction including upward and downward respectively. When the processor identifies the upward moving gesture and the downward moving gesture, the processor controls a host coupled to the hybrid pointing device of the present disclosure to respectively perform corresponding commands, such as, but not limited to, a left-button click command and a right-button click command or vice versa. Of course, the user may also move the three finger images "$F_1$" to "$F_3$" in the same direction toward left, toward right or in any predetermined direction.

It is appreciated that the user may use more than three fingers to operate on the operation field 107, 407, 507 or 607 of the hybrid pointing device 10, 40, 50 or 60. The information of predetermined or predefined gestures is previously stored in a memory or a storage unit (e.g. 102, 502 or 602) of the hybrid pointing device. The image sensor captures an image containing at least one finger image (e.g. the interruption in the first and second embodiments, the light spot of the third embodiment and the shadow in the fourth embodiment) of at least one finger of the user operated upon (including touching or hovering) the operation field. And the processor 109, 409, 509 or 609 compares a position variation of the finger image with the information of the predetermined or predefined gestures so as to identify a current gesture operated by the user.

In addition, although gestures shown in FIGS. 8a to 10b are two-dimensional images, which may or may not be divided into many sub-areas as shown in FIG. 7, the present disclosure is not limited thereto. For example, in the embodiments corresponding to FIGS. 1 to 4 (i.e. the first and second embodiments), the images captured by the image sensor may be one-dimensional image, and thus in addition to a part of gestures, such as the gestures shown in FIGS. 8c, 8d, 8e, 8f, 9e and 9f may not be recognizable, other gestures may also be recognized by the processor. Therefore, a user may also compare a position variation of the finger image in one-dimensional images with the information of predetermined gestures so as to activate corresponding commands.

As mentioned above, conventional pointing devices with optical sensor module have problems of hard to precisely control the pointer and hard to move the pointer in a relatively higher speed. And the conventional pointing devices with CTM or RTM have to be operated with relatively larger pressing force and have to be maintained in function-well condition. Therefore, the present invention provides a hybrid pointing device that has multi-touch functions so as to be operated in a more instinctive way and may operate the pointer very precisely along a desired direction and a path than the conventional pointing devices. Furthermore, since the optical navigation module of the present invention is configured to sense the gesture or movement of a user's finger, the resolution of the image sensor of all aforementioned embodiments may be not as high as the sensor of the pointing module.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A hybrid pointing device for being operated by a user on a surface, the hybrid pointing device comprising:
    a storage unit configured to store information of predetermined gestures;
    a first module configured to sense a movement of the hybrid pointing device relative to the surface;
    a second module comprising:
        a light source configured to emit light; and
        an image sensor disposed on a plane and configured to capture an image containing at least one finger image of at least one finger of the user operated upon an operation field which is located only at a top front portion of the hybrid pointing device;
    a wall extending from one end of the operation field toward the plane and configured to block a part of field of view of the image sensor in such a manner that the field of view covers the top front portion of the hybrid pointing device without covering a top rear portion of the hybrid pointing device; and
    a processor configured to compare a position variation of the finger image with the information of predetermined gestures to identify a current gesture.

2. The hybrid pointing device as claimed in claim 1, wherein the first module is an optical mouse module or a trackball mouse module.

3. The hybrid pointing device as claimed in claim 1, wherein the processor also calculates the movement sensed by the first module.

4. The hybrid pointing device as claimed in claim 1, wherein the image sensor captures the image containing one finger image of one finger of the user operated upon the operation field.

5. The hybrid pointing device as claimed in claim 4, wherein the information of predetermined gestures comprises a left moving gesture, a right moving gesture, an upward moving gesture, a downward moving gesture, a clockwise moving gesture and a counterclockwise moving gesture.

6. The hybrid pointing device as claimed in claim 1, wherein the image sensor captures the image containing two finger images of two fingers of the user operated upon the operation field.

7. The hybrid pointing device as claimed in claim 6, wherein the information of predetermined gestures comprises a moving closer gesture, a moving apart gesture, a left moving gesture, a right moving gesture, an upward moving gesture, a downward moving gesture, left-button click gesture and right-button click gesture.

8. The hybrid pointing device as claimed in claim 1, wherein the image sensor captures the image containing three finger images of three fingers of the user operated upon the operation field.

9. The hybrid pointing device as claimed in claim 8, wherein the information of predetermined gestures comprises an upward moving gesture and a downward moving gesture.

10. The hybrid pointing device as claimed in claim 9, wherein the upward moving gesture is associated with a left-button click command or a right-button click command; and the downward moving gesture is associated with the right-button click command or the left-button click command.

* * * * *